No. 656,748. Patented Aug. 28, 1900.
C. J. PULT.
SOIL CRUSHER AND PULVERIZER.
(Application filed Sept. 5, 1899.)

(No Model.)

WITNESSES
John Enders Jr.
J. E. Newton.

INVENTOR
Casper J. Pult
by Geo. R. Hamlin
Attorney

UNITED STATES PATENT OFFICE.

CASPER J. PULT, OF TONAWANDA, NEW YORK.

SOIL CRUSHER OR PULVERIZER.

SPECIFICATION forming part of Letters Patent No. 656,748, dated August 28, 1900.

Application filed September 5, 1899. Serial No. 729,527. (No model.)

*To all whom it may concern:*

Be it known that I, CASPER J. PULT, a citizen of the United States, residing at North Tonawanda, county of Erie, and State of New York, have invented certain new and useful Improvements in Soil Crushers or Pulverizers, of which the following is a specification.

This invention relates to soil crushers and pulverizers, and has for its object the provision of a simple and inexpensive hand-operated machine of improved construction designed for breaking up the soil to the desired degree of fineness to adapt it for gardening and hot-house purposes.

With this object in view the invention consists of a hopper to receive the soil or earth, a rotatable drum of improved construction in the hopper and provided with breaking or pulverizing pins or teeth, and rows of pins on the hopper which are adapted to interact with those on the drum and arranged in a novel manner relatively to the latter, whereby the soil can be ground to different degrees of fineness by turning the drum in opposite directions.

Figure 1:
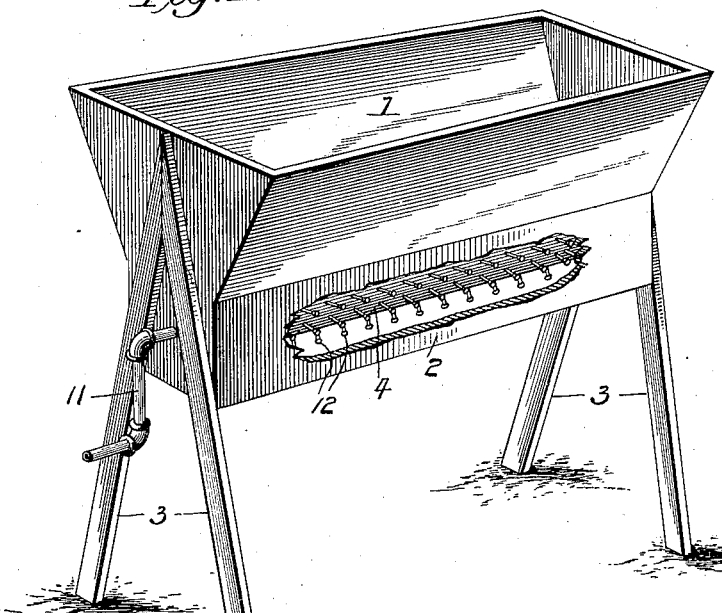
Figure 2:
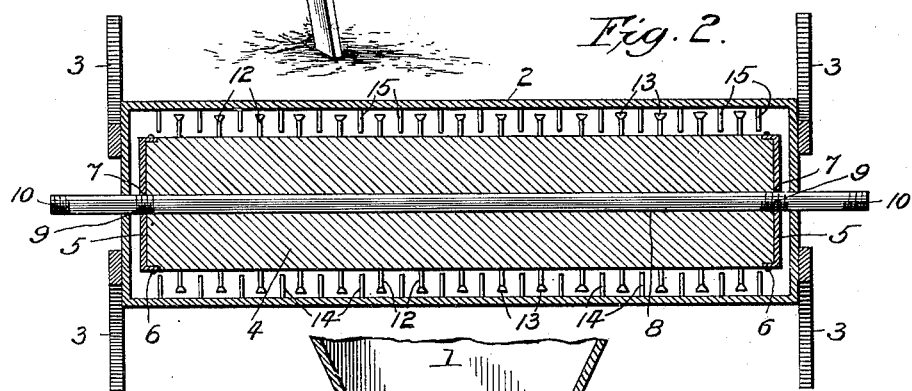
Figure 4:
Figure 3:
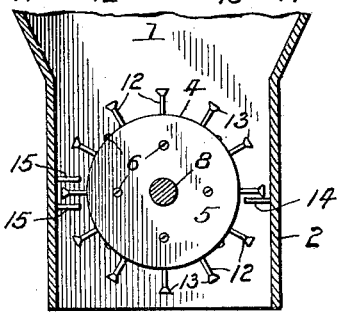
Figure 5:

In the accompanying drawings, Figure 1 is a perspective view, parts being broken away; Fig. 2, a horizontal section; Fig. 3, a cross-section, and Figs. 4 and 5 detail views.

The flaring hopper 1 is formed into a rectangular box 2 at its bottom, which has a discharge-opening and is provided with lugs 3.

The pulverizing-drum 4 is preferably constructed of wood, and over its ends are fitted metallic caps 5, held to the drum by screws 6. These caps have threaded apertures 7 at their centers, one of which is a right-hand and the other a left-hand thread. The numeral 8 designates a shaft which extends through the drum from end to end and is provided with screw-threaded portions 9, engaging the threaded apertures 7. Owing to this construction there is a constant tendency on the part of the shaft when turning to hold the caps against the ends of the drum, thus insuring strength and rigidity. The ends of the shaft are journaled in bearings in the ends of box 2, in which the drum rotates, and they have their extremities screw-threaded at 10 for connection with a crank 11, which can be applied to either end of said shaft. The drum is provided with parallel rows of straight radially-disposed pins 12, preferably of steel, which have enlarged conical or tapering heads 13 and are driven into the drum to a proper depth at suitable distances apart. After the pins have been driven into the drum a coat of glue is applied to the latter to prevent "checking." When this coat is dry, the drum is painted. This treatment of the drum prevents the pins from loosening and falling out should the drum check or become dry.

On one side of the box 2 is a single row of straight pins or teeth 14, and on the other side of said box is a double row of pins 15. These rows of teeth extend the full length of the drum and are disposed approximately along its horizontal diameter in position to interact with the teeth or pins on the drum. Unlike the pins on the drum, however, the pins 14 and 15 are not provided with heads, and in this connection I will say that by the provision of headed pins on the drum and headless pins on the box superior results are obtained in the treatment of the soil, as the headed pins press the soil against the headless pins and when passing between the latter they tear or disintegrate it very satisfactorily.

An important feature of the present invention is the provision of a single row of pins on one side of the box and a double row on the other side, as combined with straight radial pins on the drum, for by turning the drum toward the single row the soil can be pulverized to a given degree of fineness, and if a much finer pulverization is desired the crank can be applied to the other end of the shaft and the drum turned in the opposite direction to bring the double row of teeth into action. The lumpy soil is introduced into the hopper and after being forced against the pins on the box and broken issues from the bottom of the latter ready for use.

Having thus described my invention, what I claim as new, and desire to secure by Letters Patent, is—

The herein-described soil crusher or pulverizer, comprising a hopper provided with a single row of straight pins projecting inwardly from one side thereof and a double row of straight pins projecting inwardly from the other side thereof, a drum constructed in a single, integral solid piece and of a material adapted to have pins or teeth driven there-into, radially-disposed pins driven into the drum and held by friction and projecting therefrom in position for interaction with the rows of pins on the sides of the hopper, whereby provision is made for different degrees of disintegration of the material fed into the hopper by rotating the drum in opposite directions, independent or separate caps fitted over the ends of the drum and secured thereto which have right and left hand screw-threaded apertures, respectively, a shaft extending through the drum and caps and having screw-threaded portions to engage the threads in the caps, and a handle for turning said drum in either direction.

In testimony whereof I have signed my named in presence of two witnesses.

CASPER J. PULT.

Witnesses:
ADA M. WALTERS,
JAS. D. FERRIS.